US005802371A

United States Patent [19]

Meier

[11] Patent Number: 5,802,371
[45] Date of Patent: Sep. 1, 1998

[54] METHOD OF WALKING-UP A CALL STACK FOR A CLIENT/SERVER PROGRAM THAT USES REMOTE PROCEDURE CALL

[75] Inventor: Michael S. Meier, Newark, Calif.

[73] Assignee: International Business Machines Corporation, Armonk, N.Y.

[21] Appl. No.: 870,750

[22] Filed: Jun. 6, 1997

Related U.S. Application Data

[63] Continuation of Ser. No. 314,838, Sep. 29, 1994, abandoned.
[51] Int. Cl.$^6$ ...................................................... G06F 9/455
[52] U.S. Cl. .............. 395/704; 395/200.03; 395/200.33; 395/678; 395/684; 364/975.5
[58] Field of Search ........................... 395/704, 678, 395/200.31, 684, 200.03, 975.5

[56] References Cited

U.S. PATENT DOCUMENTS

| | | | |
|---|---|---|---|
| 5,127,103 | 6/1992 | Hill et al. | 395/575 |
| 5,319,645 | 6/1994 | Bassi et al. | 371/19 |
| 5,361,352 | 11/1994 | Iwasawa et al. | 395/700 |
| 5,371,746 | 12/1994 | Yamashita et al. | 371/19 |
| 5,404,523 | 4/1995 | DellaFera et al. | 395/650 |
| 5,410,648 | 4/1995 | Pazel | 395/158 |

OTHER PUBLICATIONS

Ponamgi, M. et al, Debugging Multithreaded Programs with MPD, IEEE Software, vol. 8, issue 3, pp. 37–43.

Timmerman, et al. Design of D.A.R.T.S.: A Dynamic Debugger for Multiprocessor Real–time Applications, IEEE Transactions on Nuclear Science, vol. 39, issue 2, pp. 121–129.

Borchert, C. et al, Organization and Management of Distributed Execution Event Histories for Real–time Debugging, Southeastcon, 1992 IEEE Conference Proceedings, pp. 343–345.

Tsai, J. et al, A Noninvasive Architecture to Monitor Real-Time Distributed Systems, Computer Magazine, vol. 23, issue 3, pp. 11–23.

Manabe, et al., Debugging Dynamic Distributed Programs Using Global Predicates, Parallel and Distributed Processing, 1992 Symposium (4th), pp. 402–407.

Tsai et al, On Real—time Software Testing and Debugging, Computer Software and Applications Conference, 1990 COMPSAC, pp. 519–525.

Wilson et al., "Comparative Programming Languages", 1993, pp. 120–123.

Arvind, D et al, "Debugging Concurrent Programs Using Static Analysis and Run–time Hardware Monitoring", IEEE Parallel and Distributed Processing, 1991 Proceedings, pp. 716–719.

Moher, T., "PROVIDE: A Process Visualization and Debugging Environment", IEEE Transactions on Software Engineering, pp. 849–857, Jun. 1988.

Shimomura et al, "CHASE: A Bug–Locating Assistant System", IEEE Computer Software and Applications Conference 1991 COMPSAC, pp. 412–417.

Primary Examiner—Emanuel Todd Voeltz
Assistant Examiner—Michael T. Richey
Attorney, Agent, or Firm—Prentiss Wayne Johnson

[57] ABSTRACT

When displaying the caller stack of a distributed client/server program that uses Remote Procedure Calls (RPC), the user is provided the capability of viewing the RPC calls in the same manner as normal procedure calls. When a breakpoint is encountered in an RPC server program while using a debugger for distributed programs, the call stacks for the client and server program are appended together into a single distributed call stack. In the case of nested RPC calls (e.g. program A executes an RPC call to program B which executes an RPC call to C and so on) all of the call stacks are appended together in the order they were created. The distributed call stack may span many programs, threads of execution, and computing machines. The distributed call stack may be used to select a routine from the call stack when setting a context for a tool that displays program state information. For example, when the user selects a particular routine from the distributed call stack, the source listing, variables that are currently in scope, and thread executing the routine may be shown in various display windows.

4 Claims, 12 Drawing Sheets

```
┌─────────────────────────────────────────────────────────────────┐
│ ─              PDDA 940203    345 350                      •  ⌐ │
├──────────────────────────┬──────────┬──────────────┬────────────┤
│ Locals for .main() of calc_client.c│ Callers │ Commands │ Files  │
│ mata:  array             │ .main    │ Run          │ crt0msg.c  │
│ matc:  array             │ ._start  │ Line step    │ calc_client.c│
│ rc:  0                   │          │ Call step    │ rpdce.c    │
│ i:  0                    │          │ Return step  │ calca_cstub.c│
│ j:  0                    │          │ Signal       │ dbxxx.s    │
│ xsize:  0                │          │ Edit         ├────────────┤
│ ysize:  0                │          │ Restart      │ Trace Events│
│ scalar:  0               │          │ Exit         │ NonLocals  │
│                          │          │ Preferences  │ Breakpoints│
├──────────────────────────┤          ├──────────────┴────────────┤
│                          │          │       310  Processes  305  325│
│        Watch             │          │ 1 Breakpoint     calc_client    atlantic│
│                          │          │ 2 Breakpoint     calc_client    atlantic│
│                     315 ─│          │ 3 Breakpoint     calca_server   davinci│
│                          │          │   thread  1  Breakpoint          thr│
│                          │          │   thread  2  ready       normal  idl│
│                          │          │   thread  3  suspended   cv      thr│
├──────────────────────────┤          │   thread  4  suspended   cv      thr│
│              calc_client.│          │   thread  5  suspended   cv      thr│
│ double scalar;           │          │ 4 Breakpoint     calcb_server   thistle│
│                    320 ──│          │   thread  1  Breakpoint          thr│
│ fprintf(stderr,"Calc     │          │   thread  2  ready       normal  idl│
│   Client starting\n");   │          │   thread  3  suspended   cv      thr│
│ for (i=0; i<100; i++)    │          │   thread  4  suspended   cv      thr│
│   for (j=0; j<100; j++)  │          │                                     │
│     mata[i][j] = (i*i)+j;│          │                              340 ─  │
│ xsize = 10;              │          │                                     │
│ ysize = 10;              │          │                                     │
│ scalar = 32.75;          │          │                                     │
│                          │          │                                     │
│ vectmul(10, scalar,      │          │                                     │
│   &(mata[2][14]), &rc);  │          │                                     │
│ fprintf(stderr,"calc vectmul│       │                                     │
│   rc = %d\n", rc);       │          │                                     │
│ tranmul(xsize, ysize, scalar,│      │                                     │
│   mata, &matc, &rc);     │          │                                     │
│ fprintf(stderr,"calc tranmul│       │                                     │
│   rc = %d\n", rc);       │          │                                     │
│ fprintf(stderr,"Calc client│        │                                     │
│   ending\n", rc);        │          │                                     │
│ }                        │          │                                     │
└──────────────────────────┴──────────┴─────────────────────────────┘
                              FIG. 3
```

| PDDA 940203 425 | | | |
|---|---|---|---|
| Locals for .vectmul() of calca_manager.c | Callers | Commands | Files |
| size: 10  430 | .vectmal | Run | crt0msg.c |
| scalar: 32.75  435 | .main | Line step | calca_server.c |
| vecta: ptr | .._start | Call step | calca_manager. |
| rc: → 537905748 | | Return step | util.c |
| i: 537946000 | | Signal | rpdce.c |
| | | Edit | |
| | | Restart | Trace Events |
| | | Exit | NonLocals |
| | | Preferences | Breakpoints |

```
calca_manager
#include "calcb.h"

void vectmul(long int size,
             double scalar,
             double vecta[],
             long int *rc)
{
  int i;

*rc = 0;
  for (i=0; i<size; i++)
    (vecta)[i] = scalar * (vecta)[i];
  *rc = 53;
}
                                    410 void tranmul(long int xsize,
             long int ysize,
             double scalar,
             matrixina *matin,
```

Watch

| Proccesses 305 | | | |
|---|---|---|---|
| 1 Interrupted | calc_client | atlantic | |
| thread 1 | suspended | cv | thr |
| thread 2 | Interrupted | | idl |
| thread 3 | suspended | cv | thr |
| thread 4 | suspended | cv | thr |
| thread 5 | suspended | cv | thr |
| 2 Interrupted | calc_client | atlantic | |
| thread 1 | suspended | cv | thr |
| thread 2 | Interrupted | | idl |
| thread 3 | suspended | cv | thr |
| thread 4 | suspended | cv | thr |
| thread 5 | suspended | cv | thr |
| 3 Breakpoint | calca_server | davinci | |
| thread 1 | suspended | cv | thr |
| thread 2 | ready | normal | ifl |
| thread 3 | suspended | cv | thr |
| thread 4 | ready | normal | thr |
| thread 5 | suspended | cv | thr |
| thread 6 | suspended | cv | thr |
| thread 7 | suspended | cv | thr |
| thread 8 | suspended | cv | thr |
| thread 9 | suspended | cv | thr |
| thread 10 | suspended | cv | thr |
| thread 11 | Breakpoint | | thr |
| 4 Interrupted | calcb_server | thistle | |
| thread 1 | suspended | cv | thr |
| thread 2 | Interrupted | | idl |
| thread 3 | suspended | cv | thr |
| thread 4 | suspended | cv | thr | breakpoint encountered

*FIG. 4*

| PDDA 940203 | 350 | 345 | | |
|---|---|---|---|---|

Locals for .main() of calc_client.c
- mata: array
- matc: array
- rc: 0
- i: 100
- j: 100
- xsize: 10
- ysize: 10
- scalar: 32.75

— 520

Callers
- .vectmal
- .main
- ._start

Commands
- Run
- Line step
- Call step
- Return step
- Signal
- Edit
- Restart
- Exit
- Preferences

Files
- crt0msg.c
- calca_server.c
- calca_manager.
- util.c
- rpdce.c

Trace Events

NonLocals

Breakpoints

Watch

510    calc_client.
```
double scalar;
fprintf(stderr,"Calc
    Client starting\n");
for (i=0; i<100; i++)
    for (j=0; j<100; j++)
        mata[i][j] = (i*i)+j;
xsize = 10;
ysize = 10;
scalar = 32.75;        515
vectmul(10, scalar,
    &(mata[2][14]), &rc);
fprintf(stderr,"calc vectmul
    rc = %d\n", rc);
tranmul(xsize, ysize, scalar,
    mata, &matc, &rc);
fprintf(stderr,"calc tranmul
    rc = %d\n", rc);
fprintf(stderr,"Calc client
    ending\n", rc);
}
```

| Proccesses | | | 305 |
|---|---|---|---|
| 1 Interrupted | | calc_client | atlantic |
| thread 1 | suspended | cv | thr |
| thread 2 | Interrupted | | idl |
| thread 3 | suspended | cv | thr |
| thread 4 | suspended | cv | thr |
| thread 5 | suspended | cv | thr |
| 2 Interrupted | | calc_client | atlantic |
| thread 1 | suspended | cv | thr |
| thread 2 | Interrupted | | idl |
| thread 3 | suspended | cv | thr |
| thread 4 | suspended | cv | thr |
| thread 5 | suspended | cv | thr |
| 3 Breakpoint | | calca_server | davinci |
| thread 1 | suspended | cv | thr |
| thread 2 | ready | normal | idl |
| thread 3 | suspended | cv | thr |
| thread 4 | ready | normal | thr |
| thread 5 | suspended | cv | thr |
| thread 6 | suspended | cv | thr |
| thread 7 | suspended | cv | thr |
| thread 8 | Breakpoint | cv | thr |
| thread 9 | suspended | cv | thr |
| thread 10 | suspended | cv | thr |
| thread 11 | Breakpoint | | thr |
| 4 Interrupted | | calcb_server | thistle |
| thread 1 | suspended | cv | thr |
| thread 2 | Interrupted | | idl |
| thread 3 | suspended | cv | thr |
| thread 4 | suspended | cv | thr |

FIG. 5

PDDA 940203  *350*  *345*

| Locals for .vectmul() of calca_manager.c | Callers | Commands | Files |
|---|---|---|---|
| size: 10        *425* | .vectmul | Run | crt0msg.c |
| scalar: 32.75 | .main | Line step | calca_server.c |
| vecta: ptr     *435* | ._start | Call step | calca_manager. |
| rc: →537905748 | | Return step | util.c |
| j: 537946000 | | Signal | rpdce.c |
| | | Edit | |
| | | Restart | Trace Events |
| | | Exit | NonLocals |
| | | Preferences | Breakpoints |

| Watch |
|---|
| |

| calca_manager |
|---|
| #include "calcb.h" |
|  |
| void vectmul(long int size, |
|              double scalar, |
|              double vecta[], |
|              long int *rc) |
| { |
|   int i; |
|  |
| ☞rc = 0; |
|   for (i=0; i<size; i++) |
|     (vecta)[i] = scalar * (vecta)[i]; |
|   *rc = 53; |
| } |
|  |
|  |
| void tranmul(long int xsize, |
|              long int ysize, |
|              double scalar, |
|              matrixina * matin, |

| Processes | | | |
|---|---|---|---|
| 1 Interupted | | calc_client | atlantic |
| thread 1 | suspended | cv | thr |
| thread 2 | Interrupted | | idl |
| thread 3 | suspended | cv | thr |
| thread 4 | suspended | cv | thr |
| thread 5 | suspended | cv | thr |
| 2 Interrupted | | calc_client | atlantic |
| thread 1 | suspended | cv | thr |
| thread 2 | Interrupted | | idl |
| thread 3 | suspended | cv | thr |
| thread 4 | suspended | cv | thr |
| thread 5 | suspended | cv | thr |
| 3 Breakpoint | | calca_server | davinci |
| thread 1 | suspended | cv | thr |
| thread 2 | ready | normal | idl |
| thread 3 | suspended | cv | thr |
| thread 4 | ready | normal | thr |
| thread 5 | suspended | cv | thr |
| thread 6 | suspended | cv | thr |
| thread 7 | suspended | cv | thr |
| thread 8 | Breakpoint | cv | thr |
| thread 9 | suspended | cv | thr |
| thread 10 | suspended | cv | thr |
| thread 11 | Breakpoint | | thr |
| 4 Interupted | | calcb_server | thistle |
| thread 1 | suspended | cv | thr |
| thread 2 | Interrupted | | idl |
| thread 3 | suspended | cv | thr |
| thread 4 | suspended | cv | thr | breakpoint encountered

*FIG. 6*

PDDA 940203  *350  345*

| Locals for .vectmul() of calca_manager.c | Callers | Commands | Files |
|---|---|---|---|
| mata: array | .vectmal | Run | crt0msg.c |
| matc: array | .main | Line step | calca_server.c |
| rc: 0 | ._start | Call step | calca_manager. |
| i: 100 | | Return step | util.c |
| j: 100 | | Signal | rpdce.c |
| xsize: 10 | | Edit | |
| ysize: 10 | | Restart | Trace Events |
| scalar: 32.75 | | Exit | NonLocals |
| | | Preferences | Breakpoints |

Watch calca_manager

```
double scalar;
fprintf(stderr,"Calc
   Client starting\n");
for (i=0; i<100; i++)
  for (j=0; j<100; j++)
    mata[i][j] = (i*i)+j;
xsize = 10;
ysize = 10;
scalar = 32.75;
vectmul(10, scalar,
   &(mata[2][14]), &rc);
fprintf(stderr,"calc vectmul
   rc = %d\n", rc);
tranmul(xsize, ysize, scalar,
   mata, &matc, &rc);
fprintf(stderr,"calc tranmul
   rc = %d\n", rc);
fprintf(stderr,"Calc client
   ending\n", rc);
}
```

| Processes | | | |
|---|---|---|---|
| 1 Interupted | | calc_client | atlantic |
| thread 1 | suspended | cv | thr |
| thread 2 | Interrupted | | idl |
| thread 3 | suspended | cv | thr |
| thread 4 | suspended | cv | thr |
| thread 5 | suspended | cv | thr |
| 2 Interrupted | | calc_client | atlantic |
| thread 1 | suspended | cv | thr |
| thread 2 | Interrupted | | idl |
| thread 3 | suspended | cv | thr |
| thread 4 | suspended | cv | thr |
| thread 5 | suspended | cv | thr |
| 3 Breakpoint | | calca_server | davinci |
| thread 1 | suspended | cv | thr |
| thread 2 | ready | normal | idl |
| thread 3 | suspended | cv | thr |
| thread 4 | ready | normal | thr |
| thread 5 | suspended | cv | thr |
| thread 6 | suspended | cv | thr |
| thread 7 | suspended | cv | thr |
| thread 8 | Breakpoint | cv | thr |
| thread 9 | suspended | cv | thr |
| thread 10 | suspended | cv | thr |
| thread 11 | Breakpoint | | thr |
| 4 Interrupted | | calcb_server | thistle |
| thread 1 | suspended | cv | thr |
| thread 2 | Interrupted | | idl |
| thread 3 | suspended | cv | thr |
| thread 4 | suspended | cv | thr |

PDDA 940203

Locals for .scalmul() of calcb_manager.c
- xsize: 10                                425
- ysize: 10
- scalar: 32.75
- mata: ptr                                915
- rc: → 0
- i: 0

Callers
- .vectmal
- .scalmul
- .tranmul
- .main
- .__start

Commands
- Run
- Line step
- Call step
- Return step
- Signal
- Edit
- Restart
- Exit
- Preferences

Files
- crt0msg.c
- calca_server.c
- calca_manager.
- util.c
- rpdce.c

Trace Events

NonLocals

Breakpoints

Watch calca_manager
```
for (i=0; i<xsize; i++)
    for (j=0; j<ysize; j==)
        (*matout)[j][i] =
            (*matin)[i][j];
 *rc = 33;
}
void scalmul(long int xsize,
             long int ysize,
             double scalar,
             matrixinb *mata,
             long int *rc)
{
 int i;
 *rc = 0;
 for (i=0; i<ysize; i++)
    vectmul(xsize, scalar,
        &((*mata)[i][0], rc);
 *rc = 43;
}
```

Processes

| | | | |
|---|---|---|---|
| thread | 1 | suspended | cv | thr |
| thread | 2 | Interrupted | | idl |
| thread | 3 | suspended | cv | thr |
| thread | 4 | suspended | cv | thr |
| thread | 5 | suspended | cv | thr |
| 3 Breakpoint | | calca_server | davinci |
| thread | 1 | suspended | cv | thr |
| thread | 2 | ready | normal | idl |
| thread | 3 | suspended | cv | thr |
| thread | 4 | ready | normal | thr |
| thread | 5 | suspended | cv | thr |
| thread | 6 | suspended | cv | thr |
| thread | 7 | suspended | cv | thr |
| thread | 8 | Breakpoint | cv | thr |
| thread | 9 | suspended | cv | thr |
| thread | 10 | suspended | cv | thr |
| thread | 11 | suspended | | thr |
| 4 Interupted | | calcb_server | thistle |
| thread | 1 | suspended | cv | thr |
| thread | 2 | Interrupted | | idl |
| thread | 3 | suspended | cv | thr |
| thread | 4 | suspended | cv | thr |
| thread | 5 | suspended | cv | thr |
| thread | 6 | suspended | cv | thr |
| thread | 7 | suspended | cv | thr |
| thread | 8 | suspended | cv | thr |
| thread | 9 | suspended | cv | thr |
| thread | 10 | suspended | cv | thr |
| thread | 11 | suspended | cv | thr |

PDDA 940203

Locals for .tranmul() of calca_manager.c
- xsize: 10
- ysize: 10
- scalar: 32.75
- matin: ptr
- matout: ptr
- rc: → 33

425
1005
1020

Callers
- .vectmal
- .scalmul
- .tranmul
- .main
- ._start

Commands
- Run
- Line step
- Call step
- Return step
- Signal
- Edit
- Restart
- Exit
- Preferences

Files
- crt0msg.c
- calca_server.c
- calca_manager.
- util.c
- rpdce.c

Trace Events
NonLocals
Breakpoints

Watch calca_manager
```
}
void tranmul(long int xsize,
            long int ysize,
            double scalar,
            matrixina *matin,
            matrixouta *matout,
            long int *rc)
{
   *rc = 0;
   transpos(xsize, ysize, matin,
       matout, rc);
   fprint(stderr,
     "calca_manager transpos
       rc=%d\n", *rc);
   scalmu(xsize, scalar,
       matout, rc);
   fprint(stder,
     "calca_manager scalmul
       rc=%d\n", *rc);
   *rc = 43;
}
```

Processes

| | | | |
|---|---|---|---|
| thread 1 | suspended | cv | thr |
| thread 2 | Interrupted | | idl |
| thread 3 | suspended | cv | thr |
| thread 4 | suspended | cv | thr |
| thread 5 | suspended | cv | thr |
| 3 Breakpoint | | calca_server | davinci |
| thread 1 | suspended | cv | thr |
| thread 2 | ready | normal | idl |
| thread 3 | suspended | cv | thr |
| thread 4 | ready | normal | thr |
| thread 5 | suspended | cv | thr |
| thread 6 | suspended | cv | thr |
| thread 7 | suspended | cv | thr |
| thread 8 | Breakpoint | cv | thr |
| thread 9 | suspended | cv | thr |
| thread 10 | suspended | cv | thr |
| thread 11 | suspended | | thr |
| 4 Interupted | | calcb_server | thistle |
| thread 1 | suspended | cv | thr |
| thread 2 | Interrupted | | idl |
| thread 3 | suspended | cv | thr |
| thread 4 | suspended | cv | thr |
| thread 5 | suspended | cv | thr |
| thread 6 | suspended | cv | thr |
| thread 7 | suspended | cv | thr |
| thread 8 | suspended | cv | thr |
| thread 9 | suspended | cv | thr |
| thread 10 | suspended | cv | thr |
| thread 11 | suspended | cv | thr |

PDDA 940203

Locals for .main() of calc_client.c
- mata: array
- matc: array
- rc: 53
- i: 100
- j: 100
- xsize: 10
- ysize: 10
- scalar: 32.75

Callers
- .vectmal
- .scalmal
- .tranmal
- .main
- ._start

Commands
- Run
- Line step
- Call step
- Return step
- Signal
- Edit
- Restart
- Exit
- Preferences

Files
- crt0msg.c
- calca_server.c
- calca_manager.
- util.c
- rpdce.c

Trace Events
NonLocals
Breakpoints

Watch calc_client.c
```
double scalar;

fprintf(stderr,"Calc
    Client starting\n");

for (i=0; i<100; i++)
    for (j=0; j<100; j++)
        mata[i][j] = (i*i)+j;
xsize = 10;
ysize = 10;
scalar = 32.75;

vectmul(10, scalar,
    &(mata[2][14]), &rc);
fprintf(stderr,"calc vectmul
    rc = %d\n", rc);

tranmul(xsize, ysize, scalar,
    mata, &matc, &rc);

fprintf(stderr,"calc tranmul
    rc = %d\n", rc);

fprintf(stderr,"Calc client
    ending\n", rc);
}
```

Processes

| | | | |
|---|---|---|---|
| 1 Interupted | calc_client | | atlantic |
| thread 1 | suspended | cv | thr |
| thread 2 | Interrupted | | idl |
| thread 3 | suspended | cv | thr |
| thread 4 | suspended | cv | thr |
| thread 5 | suspended | cv | thr |
| 2 Interrupted | calc_client | | atlantic |
| thread 1 | suspended | cv | thr |
| thread 2 | Interrupted | | idl |
| thread 3 | suspended | cv | thr |
| thread 4 | suspended | cv | thr |
| thread 5 | suspended | cv | thr |
| 3 Breakpoint | calca_server | | davinci |
| thread 1 | suspended | cv | thr |
| thread 2 | ready | normal | ifl |
| thread 3 | suspended | cv | thr |
| thread 4 | ready | normal | thr |
| thread 5 | suspended | cv | thr |
| thread 6 | suspended | cv | thr |
| thread 7 | suspended | cv | thr |
| thread 8 | Breakpoint | | thr |
| thread 9 | suspended | cv | thr |
| thread 10 | suspended | cv | thr |
| thread 11 | suspended | cv | thr |
| 4 Interupted | calcb_server | | thistle |
| thread 1 | suspended | cv | thr |
| thread 2 | Interrupted | | idl |
| thread 3 | suspended | cv | thr |
| thread 4 | suspended | cv | thr |

FIG. 11

METHOD OF WALKING-UP A CALL STACK FOR A CLIENT/SERVER PROGRAM THAT USES REMOTE PROCEDURE CALL

The application is a continuation of application Ser. No. 08/314,838, filed Sep. 29, 1994, now abandoned.

CROSS-REFERENCE TO RELATED APPLICATIONS

Application Ser. No. 08/314,839, filed concurrently herewith on Sep. 29, 1994 for METHOD AND SYSTEM FOR DEBUGGING PARALLEL AND DISTRIBUTED APPLICATIONS, currently co-pending, and assigned to the same assignee as the present invention.

The foregoing copending applications are incorporated herein by reference.

A portion of the Disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates in general to methods and systems in the field of software programming development, and more particularly to methods and systems used to debug software programs.

2. Description of the Related Art

One of the major inhibitors to developing parallel and distributed applications (e.g. client/server, peer-to-peer) is a lack of adequate debugging tools. To debug a parallel and distributed application, the tool should provide dbx-like functions that allow a user to monitor and control the execution of multiple programs with many threads of execution running on various machines and running on a variety of operating systems. The tool should also allow the user to display and modify the run-time states of all of those programs in a coherent fashion from a single user interface. The tool should also allow the user to display and modify the run-time states of all of those programs in such a manner that they all appear to be one program.

The state of the prior art is illustrated by Matsumoto (Japanese patent number JP 05-73367 entitled "Multiple Trace-Back Map Output System"). Matsumoto teaches the use of a PCB (parallel processing unit control table) to store the call relation between two parallel processing units when one parallel processing unit calls the other parallel processing unit. The PCB is also used to store the execution state of the calling parallel processing unit. In particular, Matsumoto teaches that one parallel processing unit when calling another parallel processing unit sets the call relation between its state and the parallel processing unit at the call destination in the PCB (parallel processing unit control table), and after the called parallel processing unit sets the execution state in the PCB, a processing is performed. If an abnormality occurs to one of the parallel processing units, the processing of all of the parallel processing units are interrupted, and then the execution states and call relation are outputted as the trace-back map by the parallel processing units by referring to the PCB. By this method, a debugging operation is made more efficient by sampling and displaying the trace-back map of the execution states of not only a parallel processing unit where an error occurs, but also all parallel process units in operation, and grasping the characteristic error, etc., at the time of a parallel processing abnormality having no reproducibility.

However, Matsumoto fails to recognize two problems resulting from the use of such a table of who-called-who relations (i.e., the processing unit control table). First, maintaining such a PCB table incurs a large overhead because a distributed program must be interrupted each time a call is made to record the new relation in the PCB, and again must be interrupted on return to delete the relation from the PCB. For "dbx-like" debuggers this overhead is substantial. Second, as the relations are recorded in the PCB in their order of occurrence, call relations from different distributed applications are intermixed in the PCB and impose burden on a user interpreting the the PCB as a trace-back map of call relations.

In view of the above problems, there is a need for a method of, and system for, determining the call relations of a distributed program without the performance overhead of recording such relations in a table. Furthermore, in view of the above problems, there is a need for a method of, and system for, displaying the call relations of a distributed program in the same manner as those of a non-distributed program.

SUMMARY OF THE INVENTION

When displaying the caller stack of a distributed client/server program that uses Remote Procedure Calls (RPC), the user is provided the capability of viewing the RPC calls in the same manner as normal procedure calls. For example, when a breakpoint is encountered in an RPC server program while using a debugger for distributed programs, the call stacks for the client and server program are appended together into a single distributed call stack. In the case of nested RPC calls (e.g. program A executes an RPC call to program B which executes an RPC call to C and so on) all of the call stacks are appended together in the order they were created. The distributed call stack may span many programs, threads of execution, and computing machines.

The distributed call stack may be used to select a routine from the call stack when setting a context for a tool that displays program state information. For example, when the user selects a particular routine from the distributed call stack, the source listing, variables that are currently in scope, and thread executing the routine may be shown in various display windows.

The invention disclosed herein comprises a method of, and system for, displaying the call stack of a distributed program that uses RPC calls by walking up a call stack for the distributed program. The present invention does not use a table of who-called-who relations (i.e., processing unit control table or PCB). Instead, the present invention walks up the call stack until it encounters the RPC routine that dispatches the user server routine. At that point, it evaluates RPC run-time data structures to determine the machine and thread that the user client is running on.

In accordance with one aspect of this invention, a method of, and system for, displaying the call stack of a distributed program that uses RPC calls is provided.

In accordance with another aspect of this invention, a method of, and system for, displaying the call stack of a distributed program that uses RPC calls is provided such that the RPC calls are displayed in the same manner as normal procedure calls.

In accordance with another aspect of the present invention, a user is allowed to debug a distributed RPC application in the same way that a non-distributed application would be debugged.

In accordance with another aspect of the present invention, a method of, and system for, correlating a particular invocation of a RPC server routine with a particular client program is provided.

In accordance with another aspect of the present invention, capabilities to simplify the process of debugging a client/server program are provided.

BRIEF DESCRIPTION OF THE DRAWINGS

For a more complete understanding of the present invention and the advantages thereof, reference is now made to the Detailed Description in conjunction with the attached Drawings, in which:

FIG. 3 is pictorial representation of an initial PDDA (Parallel and Distributed Dynamic Analyzer) debugger window in accordance with the method of, and system for, the present invention;

FIG. 4 is pictorial representation of a PDDA debugger window after the distributed application has hit a first breakpoint in a program "vectmul" in accordance with the method of, and system for, the present invention;

FIG. 5 is pictorial representation of a PDDA debugger window illustrating walking up a call stack after the first break point in accordance with the method of, and system for, the present invention;

FIG. 6 is pictorial representation of a PDDA debugger window after the distributed application has hit the breakpoint in the program "vectmul" a second time in accordance with the method of, and system for, the present invention;

FIG. 7 is pictorial representation of a PDDA debugger window illustrating walking up a call stack after the second break point in accordance with the method of, and system for, the present invention;

FIG. 8 is pictorial representation of a PDDA debugger window after the distributed application has hit the breakpoint in the program "vectmul" a third time in accordance with the method of, and system for, the present invention;

FIG. 9 is pictorial representation of a PDDA debugger window after walking up the call stack to a program "scalmul" in accordance with the method of, and system for, the present invention;

FIG. 10 is pictorial representation of a PDDA debugger window after walking up the call stack to a program "transmul" in accordance with the method of, and system for, the present invention;

FIG. 11 is pictorial representation of a PDDA debugger window after walking up the call stack to a program "main" in accordance with the method of, and system for, the present invention.

DESCRIPTION OF THE PREFERRED EMBODIMENT

Figure 1:
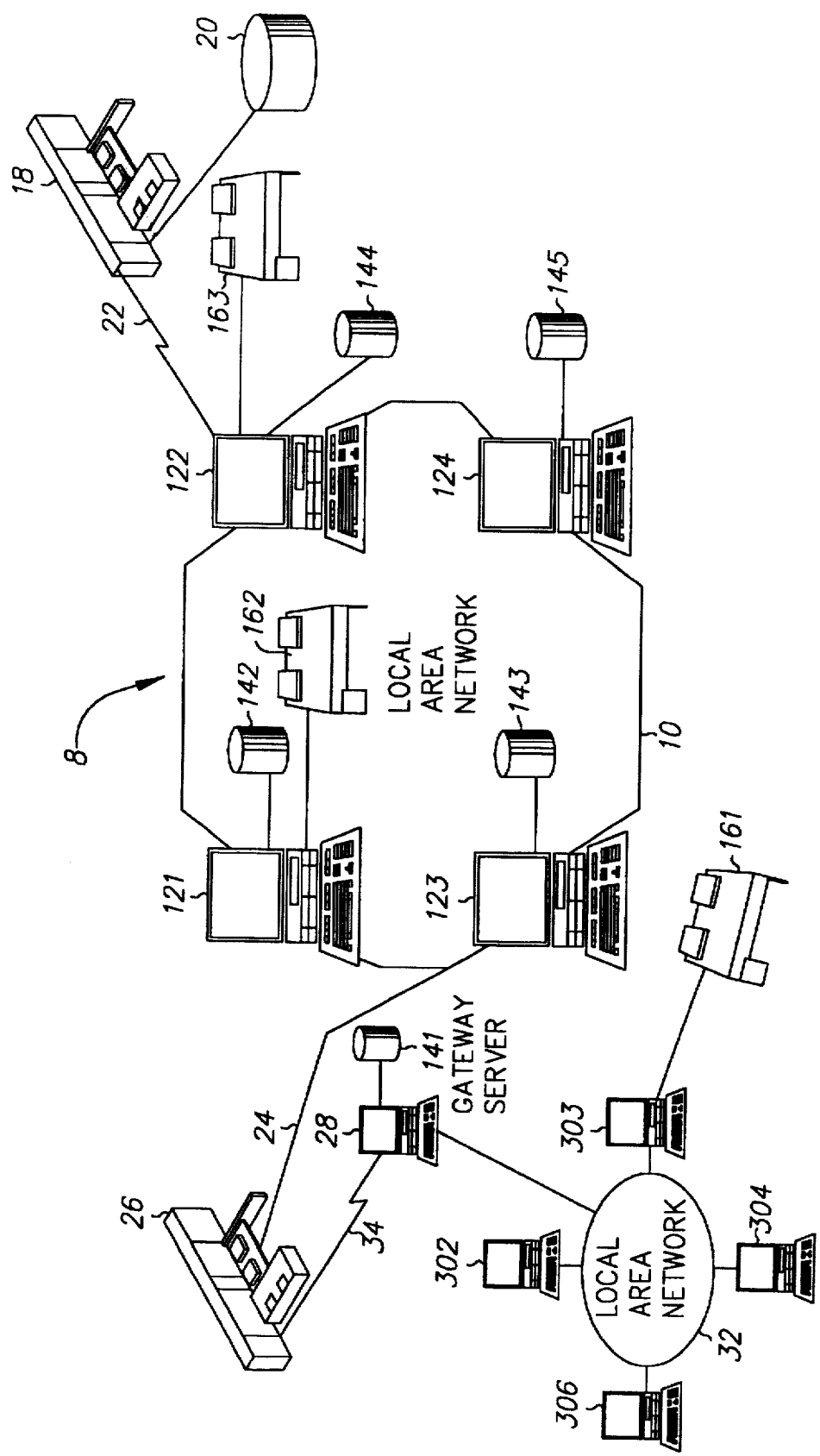
FIG. 1 is a pictorial representation of a distributed data processing system which may be used to implement the method of the present invention.

With reference now to the figures and in particular with reference to FIG. 1, there is depicted a pictorial representation of a data processing system 8 which may be utilized to implement the method of the present invention. As may be seen, data processing system 8 may include a plurality of networks, such as Local Area Networks (LAN) 10 and 32, each of which preferably includes a plurality of individual computers 121, 122, 123, 124, 301, 302, 303, and 304, respectively. Of course, those skilled in the art will appreciate that a plurality of Intelligent Work Stations (IWS) coupled to a host processor may be utilized for each such network.

As is common in such data processing systems, each individual computer may be coupled to a storage device 141, 142, 143, 144, and 145 and/or a printer/output device 161, 162, and 163. One or more such storage devices 14 may be utilized, in accordance with the method of the present invention, to store the various computer programs which may be accessed, executed, and debugged by a user within data processing system 8, in accordance with the method of the present invention. In a manner well known in the prior art, each such computer program may be stored within a storage device 141, 142, 143, 144, and 145.

Still referring to FIG. 1, it may be seen that data processing system 8 may also include multiple mainframe computers, such as mainframe computer 18, which may be preferably coupled to Local Area Network 10 by means of communication link 22. Mainframe computer 18 may also be coupled to a storage device 20 which may serve as remote storage for Local Area Network 10 which may be coupled via communications controller 26 and communications link 34 to a gateway server 28. Gateway server 28 is preferably an individual computer or Intelligent Work Station which serves to link Local Area Network 32 to Local Area Network 10.

As discussed above with respect to Local Area Network 32 and Local Area Network 10, a plurality of server computer programs may be stored within storage device 20 and executed by mainframe computer 18. Similarly, a plurality of client computer programs may be stored within storage devices 141, 142, 143, 144, and 145 and executed by individual computers 121, 122, 123, and 124 such that distributed client/server computer programs are provided. Of course, those skilled in the art will appreciate that the mainframe computer 18 may be located a great geographical distance from Local Area Network 10, and similarly, Local Area Network 10 may be located a substantial distance from Local Area Network 32. That is, Local Area Network 32 may be located in California while Local Area Network 10 may be located within Texas and mainframe computer 18 may be located in New York.

As will be appreciated upon reference to the foregoing, it is often desirable for a user within one portion of distributed data processing system 8 to execute computer programs on one or more portions of data processing system 8. For example, the user may execute an client computer program on computer 121, 122, 123, and 124 which requests services from a server program executing on mainframe 18 which further requests services from service routines executing on computer 301, 302, 303, and 304. To verify the proper operation of such a distributed set of client/server programs, the user may wish to debug the distributed set of client/server programs as if they were one single program. Therefore, it should be obvious that a need exists for a method whereby the user may debug the distributed set of client/server programs as if they were one single program.

The present invention meets this need by providing a "distributed call stack," wherein the call stacks of the client and server programs are appended together to form a single distributed call stack. The present invention also provides the capability of walking up this distributed call stack.

The distributed call stack may be used to select a routine from the call stack when setting a context for a tool that displays program state information. For example, when a user selects a particular routine from the distributed call stack, the source listing, variables that are currently in scope, and thread executing the routine may be shown in various display windows.

This invention is based on PDDA (Parallel and Distributed Dynamic Analyzer) which is a tool for debugging parallel and distributed applications that use RPC and threads. The following is an example of how PDDA uses this invention to display a distributed call stack.

Figure 2:
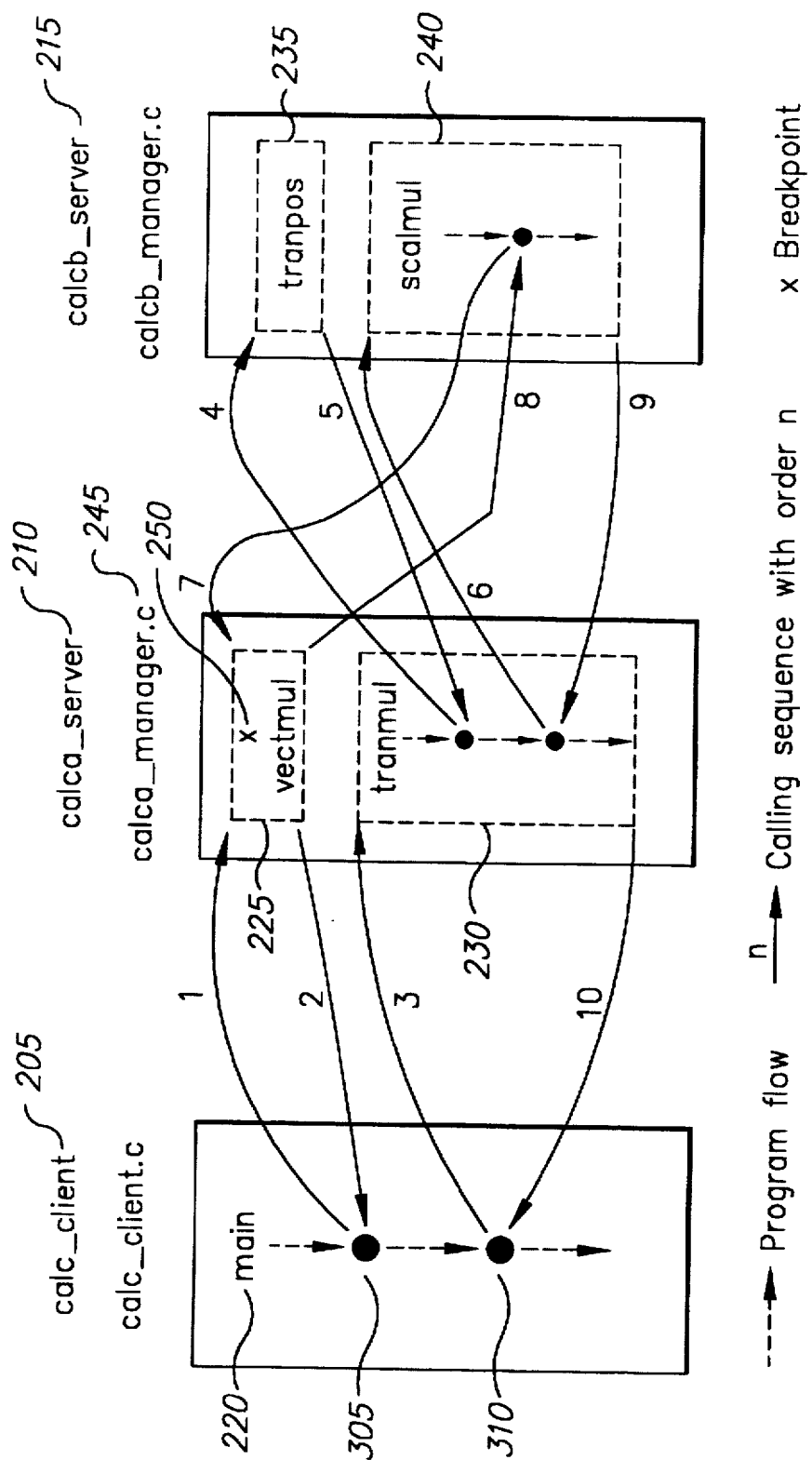
FIG. 2 is pictorial representation of an implementation, program execution flows, and order of calling sequence of a distributed application executing on a distributed data processing system.

The example program that PDDA is debugging is a Distributed Computing Environment (DCE) application for client/server computing. FIG. 2 illustrates the implementation, program execution flows, and the order of calling sequence of the example distributed application. The application is composed of one client (calc_client 205) and two servers (calca_server 210 and calcb_server 215). The main routine 220 of the calc_client 205 calls the subroutine vectmul 225 for vector multiplication and the subroutine tranmul 230 for matrix transpose followed by a matrix multiplication. The other server, calcb_server 215, includes two subroutines transpos 235 and scalmul 240 that are called by the tranmul routine 230 of the calca_server 210.

For the purposes of demonstration, assume that a breakpoint 250 is set at the first executable statement of the subroutine vectmul 225 in the file calca_manager.c 245. In addition, the example distributed application is started with two instances of the client (calc_client) 305 and 310, and one instance of each of the two servers (calca_server 315 and calcb_server 320) on three IBM RISC/6000 workstations: atlantic 325, davinci 330, and thistle 335. FIG. 3 illustrates an initial PDDA window after setting the breakpoints, but before the distributed application is executed. The distribution of this example distributed application is indicated in a Processes pane 340: two identical clients named calc_client, 305 and 310, running on the host atlantic 325, one calca_server 315 running on the host davinci 330, and one calcb_server 320 running on the host thistle 335.

The user may now click on a Run command 345 in a Commands pane 350 to start the distributed application execution. Once the execution reaches a breakpoint, the running thread with the breakpoint is immediately stopped. Meanwhile, PDDA broadcasts interrupt signals to stop other associated threads. As a result, a frozen process state is displayed in the window. FIG. 4 shows the frozen process state of the distributed application after the breakpoint 250 in vectmul 225 is hit. By observing the highlighted entry 405 in the Processes pane 340 of FIG. 4, the user may see that Thread 11 410 (a server application thread) of calca_server 315 running on host davinci 330 has hit the breakpoint 250. Moreover, information of other interrupted threads in this application is also displayed in the Processes pane 340 with the label Interrupted, e.g., Thread 2 415 of the first client calc_client 305 running on host atlantic 325, Thread 2 420 of the second client calc_client 310 running on host atlantic 325, and Thread 2 425 of calcb_server 320 running on host thistle 335.

Note that in this example distributed application, for each client or server program, DCE first allocates five DCE threads that are part of the RPC implementation. Both calca_server and calcb_server requested DCE to allocate six threads for executing client requests. This allows each server to handle up to six client requests concurrently. Therefore, there are eleven threads under the calca_server on host davinci and calcb_server on host thistle.

In order to learn the exact program behavior, the user may wish to know which client sent the request to calca_server. PDDA displays RPC calls in a Callers pane 425 as if they are normal subroutine calls. The Callers pane 425 in FIG. 4 shows the subroutine vectmul 430 is called by the main routine 435. By clicking on main 435 in the Callers pane 425 of FIG. 4, the window illustrated in FIG. 5 is presented which displays the information regarding the caller main. In the Processes pane 340, Thread 1 505 of the first client 305 is highlighted. This shows the first client 305 sent the request to calca_server. In addition, a Source pane 510 displays a source file of the first client (calc_client.c) and highlights a statement 515 that invoked the subroutine vectmul. A Locals pane 520 displays values of local variables for the main routine of calc_client.c.

To continue the execution, the user may click on the Run command 345 in the Commands pane 350. The execution is stopped after hitting the breakpoint in subroutine vectmul again as indicated in FIG. 6. After the user clicks on the main entry 435 in the Callers pane 425, a window is presented as illustrated in FIG. 7 which shows that the call to vectmul is from the second instance of the client. This result demonstrates that both clients are running in parallel. The windows illustrated in FIG. 5 and FIG. 7 show the user that both clients have reached the breakpoint in vectmul via the Calling-sequence 1 in FIG. 2.

The user may then click on the Run command 345. The execution is again stopped after hitting the breakpoint in subroutine vectmul. Note that vectmul is part of calca_server 805 and is running in Thread 8 810 on host davinci 330 as shown in the windows illustrated in FIG. 8. This invocation of vectmul is a result of the Calling sequence 7 in FIG. 2 (main→tranmul→scalmul→vectmul). After clicking on scalmul 815 in the Callers pane 425, the user may see that this subroutine is part of calcb_server 905 and is running in Thread 11 910 on host thistle 335 as indicated in the window illustrated in FIG. 9.

To continue walking up the distributed call stack, the user may click on transmul 915 in the Callers pane 425 and obtain the window illustrated in FIG. 10. FIG. 10 shows that subroutine transmul 1005 is part of calca_server 1010 and is running in Thread 6 1015 on host davinci 330.

Figure 8:
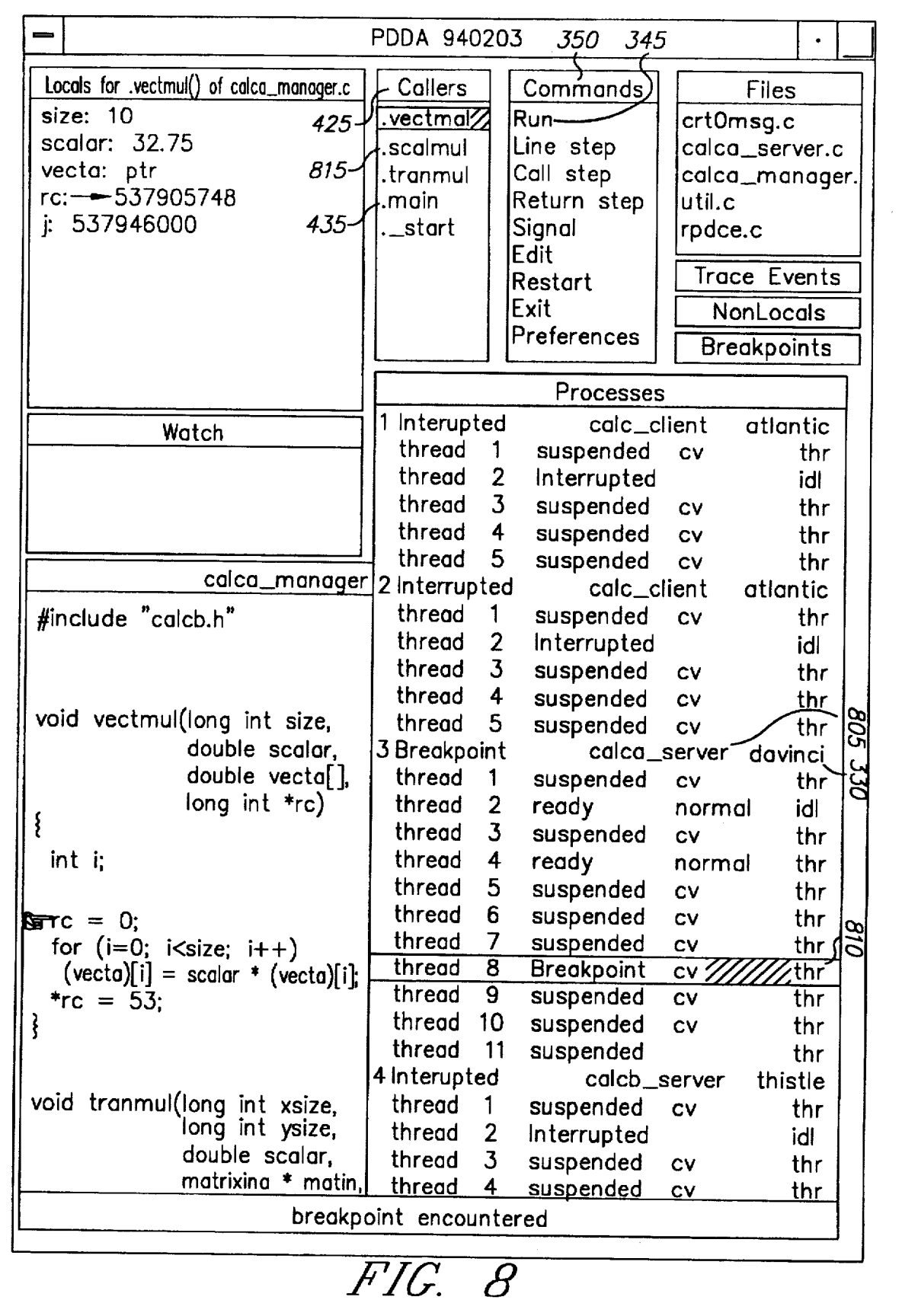

By looking at both the windows illustrated in FIG. 8 and FIG. 10, the user may see that both Thread 8 810 and Thread 6 1015 in calca_server running on the same host davinci are being used to execute this call sequence. Finally, after the user clicks on main 1020 in the Callers pane 425, the window illustrated in FIG. 11 is presented which shows that this main routine 1105 belongs to the first instance of calc_client 1110.

To provide the capability of walking up a distributed call stack, two sets of routine are provided: first, a set of routines that will be part of the RPC run-time library; and second, a routine which will "walk up" the program call stack and invoke those RPC run-time routines. The RPC run-time routines are used to determine when an RPC server dispatch routine is encountered, when an RPC client call routine is encountered, and to locate the Internet Protocol (IP) address, address space ID, and thread ID of the RPC call site. This method is applicable to many versions of RPC including the Distributed Computing Environment (DCE), Apollo, and Sun.

Data Types

The following data types are used to define an interface to the RPC run-time routines:

```
ipaddr_t
    A type to represent the IP machine address. For
    example, for UNIX the IP address is represented as a 32
    bit quantity. The following C type declaration could
    be used:
        typedef unsigned long ipaddr_t;
addrspace_id_t
    The address space ID. For example, on UNIX machines
    the UNIX process ID can be used as the address space
    ID. The following C type declaration may be used:
        typedef unsigned long addrspace_id_t;
thread_id_t
    The thread ID. For example, for UNIX when the
    application uses a POSIX thread compliant threads
    interface. The following C type declaration may be
    used:
        typedef pthread_t thread_id_t;
```

RPC Run-time Library Routines

The RPC run-time library routines are rpcIsServerDispatchRoutine, rpcIsClientCall, and rpcLocateClient. The interfaces and functions of these RPC run-time library routines are described below. The implementation of these routines is simpler if they are implemented as part of the RPC run-time library which allows the routines to access the internal data structures. This implementation is easier to maintain when changes are made to the RPC run-time library routines.

rpcIsServerDispatchRoutine

When walking up the call stack for a thread, it must be determined if the routine is the RPC server dispatch routine. This is accomplished by the routine rpcIsServerDispatchRoutine that when given an instruction address, returns a "1" if it points into an RPC server dispatch routine, and returns a "0" if it does not. The interface of rpcIsServerDispatchRoutine is as follows:

```
int rpcIsServerDispatchRoutine(addrspace_id_t asid,
                               unsigned long instraddr,
                               int *status);
Where:
    asid
        is the ID of an address space
    instraddr
        is an instruction address
    status
        is a pointer to an int where the status code is
        returned. The value returned will be one of:
            error_status_ok
            normal completion
            dbg_asid_not_found
            no address space found with specified address
            space ID.
``` rpcIsClientCall

When walking up the call stack for a thread, it must be determined if the routine is an RPC client call (e.g. a client stub routine for DCE and Apollo RPC, or the client call library routine for SUN RPC). This is accomplished by the routine rpcIsClientCall that, when given an instruction address, returns a "1" if it points into an RPC client call, and returns a "0" if it does not. The interface of rpcIsClientCall is as follows:

```
int rpcIsClientCall(addrspace_id_t asid,
                    unsigned long instraddr,
                    int *status);
Where:
    asid
        is the ID of an address space.
    instraddr
        is an instruction address.
    status
        is a pointer to an int where the status code is
        returned. The value returned will be one of:
            error_status_ok
            normal completion
            dbg_asid_not_found
            no address space found with specified address
            space ID.
``` rpcLocateClient

When the RPC server dispatch routine is encountered while walking up the call stack, the IP address, address space ID, and thread ID of the client where the RPC call was made needs to be located. This is accomplished by the routine rpcLocateClient. The interface of rpcLocateClient is as follows:

```
void rpcLocateClient (addrspace_id_t serverasid,
                      thread_id_t serverthreadid,
                      ipaddr_t *clientipaddr,
                      addrspace_id_t *clientasid,
                      thread_id_t *clientthreadid,
                      int *status);
Where:
    serverasid
        is the ID of an address space of the server.
    serverthreadid
        is the ID of the thread of the server.
    clientipaddr
        is a pointer to a variable of type.
    ipaddr_t
        is where the internet address of the client is
        returned.
    clientasid
        is a pointer to a variable of type.
    addrspace_id_t
        is where the ID of the address space of the client
        is returned.
    clientthreadid
        is a pointer to a variable of type.
    thread_id_t
        is where the ID of the thread of the client is
        returned.
    status
        is a pointer to an int where the status code is
        returned. The value returned will be one of:
            error_status_ok
            normal completion
            dbg_asid_not_found
            no address space found with specified
            address space ID.
            dbg_thread_not_found
            no thread found with specified thread ID.
            dbg_not_server, the specified thread is not
            running an RPC server routine.
```

Routine to Walk Up Distributed Call Stack

The following are the steps for walking up the distributed call stack from within a distributed debugger after a breakpoint has been encountered. It is assumed that the distributed debugger has stopped all threads on all machines that are part of the distributed application. The distributed debugger must be able to retrieve and display the program state of any thread running on any machine. For example, a call is made to set the context which is identified by a 3-tuple consisting of a machine IP address, address space ID, and thread ID. Once a context is set, all requests to read and write program state are for the thread running in the address space on the machine specified in the tuple.

Figure 12:
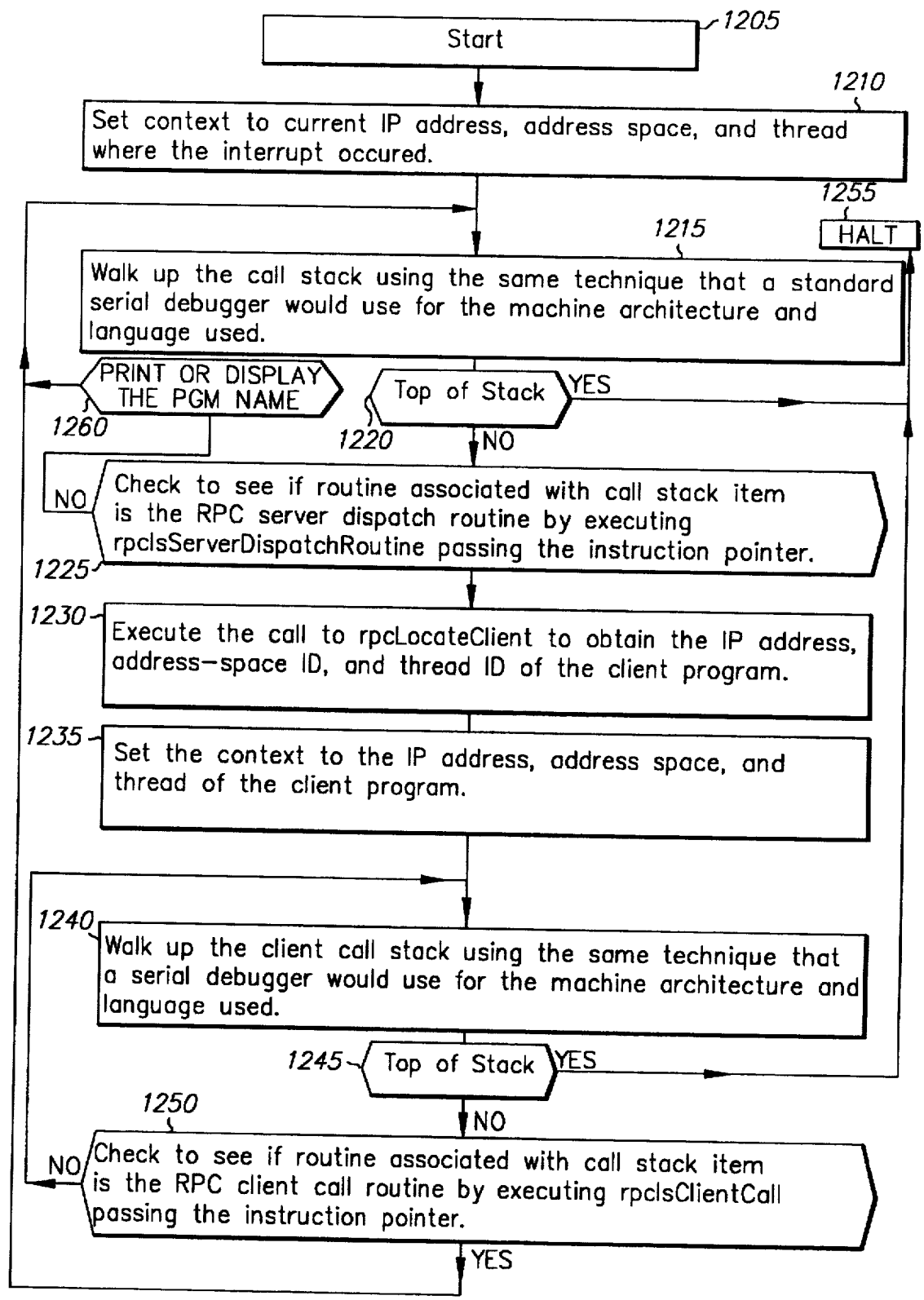
FIG. 12 is a high level flow chart illustrating the operations preferred in carrying out the method of, and forming the system for, the present invention.

Referring now to FIG. 12, a flowchart illustrating the operations preferred in carrying out the method of, and system for, the routine to walk up the distributed call stack are disclosed. In the flowchart, the graphical conventions of a diamond for a test or decision and a rectangle for a process or function are used. These conventions are well understood by those skilled in the art, and the flowcharts are sufficient to enable one of ordinary skill to write code in any suitable computer programming language.

This routine walks up a distributed call stack and displays a distributed call stack. After the start of the routine at processing block 1205, processing block 1210 sets the context to the IP address, address space, and thread where the breakpoint occurred. Thereafter, processing block 1215 walks up the call stack using the same technique that a standard serial debugger would use for the machine architecture and the language used. Thereafter, decision block 1220 determines if the top of the stack is encountered. If the top of the stack is not encountered, then decision block 1225 determines if the routine associated with the call stack item is an RPC server dispatch routine by executing the rpcIsServerDispatchRoutine routine passing the instruction pointer. If the routine associated with the call stack item is an RPC server dispatch routine, then processing block 1230 executes the rpcLocateClient to obtain the IP address, address space ID, and thread ID of the client. Thereafter, processing block 1235 sets the context to the IP address, address space, and thread of the client. Thereafter, processing block 1240 walks up that call stack using the same technique that a standard serial debugger would use for the machine architecture and the language used. Thereafter, decision block 1245 determines if the top of the stack is encountered. If the top of the stack is not encountered, then decision block 1250 determines if the routine associated with the call stack item is an RPC client call routine by executing the rpcIsClientCall routine passing the instruction pointer. If it's not, then processing loops back to processing block 1240 effectively ignoring it, and continuing up the call stack. This is done to bypass some of the communication routines which are generally of no interest to an application developer. Optionally these routines may be displayed.

Referring back to decision block 1250, if the routine associated with the call stack item is an RPC client call routine, then processing loops back to processing block 1215 to continue walking up the call stack.

Referring back to decision block 1245, if the top of the stack is encountered, then processing is halted at process block 1255.

Referring back to decision block 1225, if the routine associated with the call stack item is an RPC server dispatch routine, then processing block 1260 prints or displays the name of the routine associated with the call stack item. Thereafter, processing loops back to processing block 1215 to continue walking up the call stack.

Referring back to decision block 1220, if the top of the stack is encountered, then processing is halted at process block 1255.

Using the foregoing specifications, the invention may be implemented using standard programming techniques. The resulting programs may be stored on disk, diskettes, memory cards, ROM or any other memory device for use in a computer. For execution, the program may be copied into the RAM of the computer. One skilled in the art of computer science will easily be able to combine the software created as described with appropriate general purpose or special purpose computer hardware to create a system for executing the programs. While the preferred embodiment of the present invention has been illustrated in detail, it should be apparent that modifications and adaptations to that embodiment may occur to one skilled in the art without departing from the scope of the present invention as set forth in the following claims.

We claim:

1. A method for debugging a distributed computer program comprising a client program executing on a first portion of a distributed data processing system and a server program executing on a second portion of the distributed data processing system, said method comprising the steps of:

(a) determining a first call stack on the first portion of the distributed data processing system of the client program;

(b) determining a second call stack on the second portion of the distributed data processing system of the server program by evaluating remote procedure call (RPC) run-time data structures;

(c) appending the first call stack and second call stack together on the first portion of the distributed data processing system to form a single distributed call stack;

(d) displaying on the first portion of the distributed data processing system the single distributed call stack;

(e) setting a current context to a context where a breakpoint occurs;

(f) walking up a call stack of the current context;

(g) for each routine in the current context call stack, determining if it is a server dispatch routine, and
if it's not a server dispatch routine, outputting the program name and continuing up the current context call stack, and
if it is a server dispatch routine, obtaining a context of a client dispatched by the server dispatch routine, and setting the current context to the context of the dispatched client;

(h) walking up a call stack of the current context of the dispatched client; and (i) for each routine in the call stack of the current context of the dispatched client, determining if it is a client call, and if it is a client call, looping back to step (f).

2. A method for debugging a distributed computer program executing on a distributed data processing system, said method comprising the steps of:

(a) encountering a breakpoint in the distributed computer program;

(b) stopping all threads which comprise the distributed computer program;

(c) setting a current context to a context of a routine where the breakpoint occurred;

(d) walking up the call stack;

(e) for each routine in the call stack, determining if it is a server dispatch routine;

(f) for each routine, if it's not a server dispatch routine, outputting the program name and continuing up the call stack;

(g) for each routine, if it is a server dispatch routine, obtaining a context of a client;

(h) setting the current context to context of the client;

(i) walking up the client call stack;

(j) for each routine, determining if it is a client call; and (k) for each routine, if it is a client call, looping back to step (d).

3. A distributed data processing system for debugging a distributed computer program comprising a client program executing on a first portion of the distributed data processing system and a server program executing on a second portion of the distributed data processing system, said distributed data processing system comprising:

(a) means for determining a first call stack on the first portion of the distributed data processing system of the client program;

(b) means for determining a second call stack on the second portion of the distributed data processing system of the server program by evaluating remote procedure call (RPC) run-time data structures;

(c) means for appending the first call stack and second call stack together on the first portion of the distributed data processing system to form a single distributed call stack;

(d) means for displaying on the first portion of the distributed data processing system the single distributed call stack;

(e) means for setting a current context to a context where a breakpoint occurs;

(f) means for walking up a call stack of the current context;

(g) means for determining for each routine in the current context call stack, if it is a server dispatch routine, and if it's not a server dispatch routine, means for outputting the program name and continuing up the current context call stack, and if it is a server dispatch routine, means for obtaining a context of a client dispatched by the server dispatch routine, and setting the current context to the context of the dispatched client;

(h) means for walking up a call stack of the current context of the dispatched client; and (i) means for determining for each routine in the call stack of the current context of the dispatched client, if it is a client call, and if it is a client call, means for looping back to means (f).

4. A distributed data processing system for debugging a distributed computer program, said system comprising:

(a) means for encountering a breakpoint in the distributed computer program;

(b) means for stopping all threads which comprise the distributed computer program;

(c) means for setting a current context to a context of a routine where the breakpoint occurred;

(d) means for walking up the call stack;

(e) means for determining for each routine in the call stack, if it is a server dispatch routine;

(f) means for outputting the program name for each routine, if it's not a server dispatch routine, and continuing up the call stack;

(g) means for obtaining a context of a client for each routine, if it is a server dispatch routine;

(h) means for setting the current context to context of the client;

(i) means for walking up the client call stack;

(j) means for determining for each routine, if it is a client call; and (k) means for looping back to means (d) for each routine, if it is a client call.

* * * * *